United States Patent
Chen et al.

(10) Patent No.: US 10,002,437 B2
(45) Date of Patent: Jun. 19, 2018

(54) METHOD AND ELECTRONIC DEVICE OF IDENTIFYING REDUNDANT DATA

(71) Applicant: Shenzhen ESUN Display Co., Ltd, Shenzhen (CN)

(72) Inventors: Hailong Chen, Shenzhen (CN); Hongchen Zhu, Shenzhen (CN); Zhenkun Wen, Shenzhen (CN); Donglin Feng, Shenzhen (CN); Dong He, Shenzhen (CN)

(73) Assignee: SHENZHEN ESUN DISPLAY CO., LTD, Shenzhen (CN)

( * ) Notice: Subject to any disclaimer, the term of this patent is extended or adjusted under 35 U.S.C. 154(b) by 106 days.

(21) Appl. No.: 15/202,586

(22) Filed: Jul. 6, 2016

(65) Prior Publication Data
US 2017/0069099 A1 Mar. 9, 2017

(30) Foreign Application Priority Data
Sep. 7, 2015 (CN) .......................... 2015 1 0564424

(51) Int. Cl.
*G06K 9/00* (2006.01)
*G06T 7/30* (2017.01)
*G06K 9/62* (2006.01)

(52) U.S. Cl.
CPC .............. *G06T 7/30* (2017.01); *G06K 9/6211* (2013.01); *G06K 2209/40* (2013.01); *G06T 2207/10028* (2013.01)

(58) Field of Classification Search
None
See application file for complete search history.

(56) References Cited

U.S. PATENT DOCUMENTS 6,668,082 B1 * 12/2003 Davison .................... G06T 7/55
345/419
2014/0002597 A1 * 1/2014 Taguchi ............. H04N 13/0275
348/43

* cited by examiner

*Primary Examiner* — Sean Conner
(74) *Attorney, Agent, or Firm* — Hemisphere Law, PLLC; Zhigang Ma

(57) ABSTRACT

An electronic device and method determines redundant data by obtaining a reference data patch and a comparative data patch, selecting at least one reference data point from the reference 3D data patch and at least one comparative data point from the comparative 3D data patch, and combining the reference data point and the data points in the reference 3D data patch which are adjacent to a pixel coordinate of the reference data point to form a triangular patch. A determination is made whether a distance between the reference data point and the comparative data point in a pair of nearest points is greater than a second distance threshold to determine the redundant data.

17 Claims, 7 Drawing Sheets

First 3D data patch B

Second 3D data patch B

| D11 | D12 | D13 | D14 | D15 |
|-----|-----|-----|-----|-----|
| D21 | D22 | D23 | D24 | D25 |
| D31 | D32 | D33 | D34 | D35 |
| D41 | D42 | D43 | D44 | D45 |
| D51 | D52 | D53 | D54 | D55 |

METHOD AND ELECTRONIC DEVICE OF IDENTIFYING REDUNDANT DATA

TECHNICAL FIELD

The present disclosure relates to the field of 3D image processing, and in particular, to a method and electronic device of identifying redundant data in a 3D image.

BACKGROUND

Three-dimensional (3D) scanning and imaging technology is capable of transforming stereoscopic information measured from tangible objects into digital signals to digitalize various objects. Typically, in 3D scanning, only one side surface of an object can be measured from a visual sensor. As such, it is needed to measure the object from multiple visual angles for a complete 3D contour of the object. That is, it is needed to obtain data of different side surfaces of the object from different positions and visual angles. However, since a same position of the object would be scanned by couple times while the vision of scanning is unavoidable of overlapping, the 3D data would include redundant data. The redundant data will take up more storage space and further affect the subsequent processing of the 3D data. Therefore, it is very important to identify the redundant data from the 3D data which is obtained under different scanning views.

BRIEF DESCRIPTION OF THE DRAWINGS

In order to illustrate more clearly with prior arts or embodiment of the present disclosure, the figures needed to be used in the embodiments of the present disclosure or prior arts will be described briefly in the following section. It is noted that the figures described below only relate to some embodiments of the present disclosure. For ordinary person skilled in the art, some other drawings according to these drawings can be easily got without paying creative work.

DETAILED DESCRIPTION

To make the objectives, technical solutions, and advantages of the present disclosure clearer, the present disclosure is further described in detail in combination with specific embodiments and attached drawings. It should be understood that the embodiments described here are only exemplary ones for illustrating the present disclosure, and are not intended to limit the present disclosure.

In the process of 3D scanning, a visual sensor can only get to data of single side surface of the object by one measurement. As such, it is needed to measure the object from multiple visual angles, to obtain the data of a complete 3D contour of the object. That is, it is needed to obtain data of different side surfaces of the object from different positions and visual angles. For the convenience of description, the data obtained from different side surfaces will be called 3D data patches, respectively.

As used herein, the term "data patch" refers to electronic data from multiple external data points representative of a tangible object measured from a visual sensor. The external data points may include measurements about the size, volume, and distance between two or more points. The visual sensors may be a camera, scanner, or other data measurement device.

As used herein, the term "redundant data" and "non-redundant data" refers to electronic data in the data patch that may be determined as being irrelevant or relevant data. The determination is according to one or more distances/measurements according to the external data points and/or data that is a duplicate of previous data.

Figure 1:
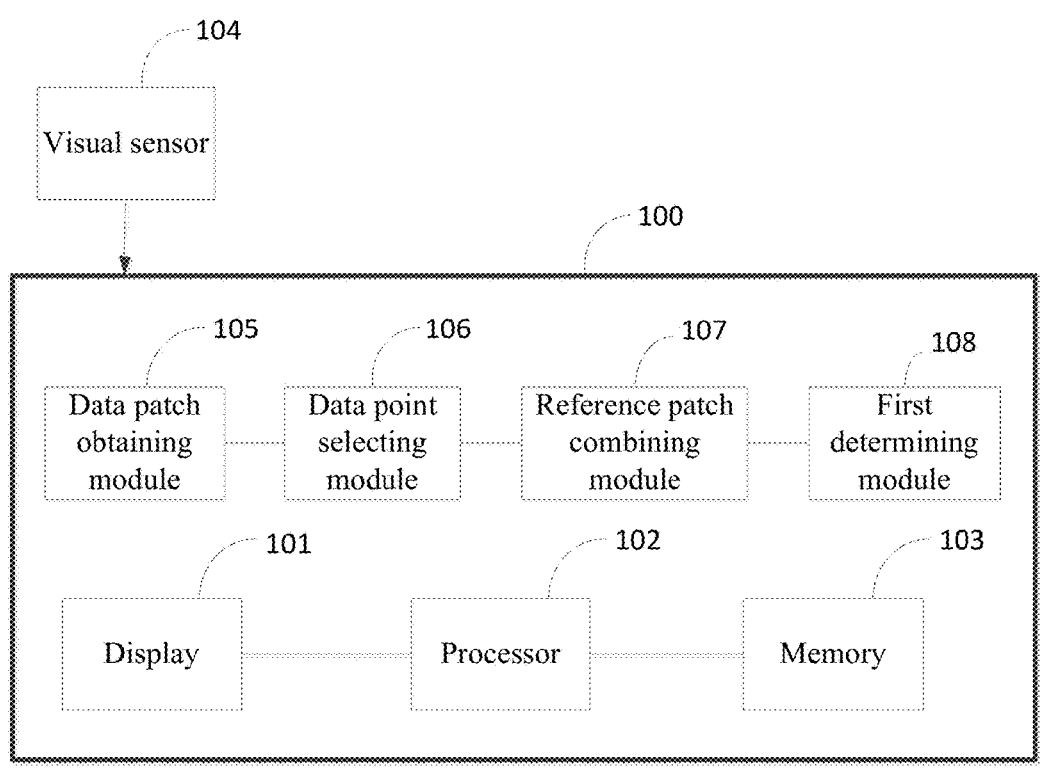
FIG. 1 is a block diagram of an electronic device according to one embodiment of the disclosure.

FIG. 1 is a block diagram of an electronic device 100 according to one embodiment of the disclosure. The electronic device 100 may be an image measuring machine, a point cloud data machine, for example. The electronic device 100, in one embodiment, may include a display 101, one or more processors 102, and memory 103. The memory 103 may be volatile or non-volatile memory and store one or more software programs configured to store and execute data patch information as disclosed below. The processors 102 are configured to execute programmable code related to the data patch information and other operations. In one embodiment, the electronic device 100 may include or be electronically coupled to or networked to one or more visual sensors 104 (e.g., camera). The visual sensors 104 are configured to capture one or more images or representative images of a tangible object to collect measurement data of the tangible object.

In one embodiment, the electronic device 100 further includes a data patch obtaining module 105, a data point selecting module 106, a reference patch combining module 107, and a first determining module 108. The modules 105-108, in one embodiment, may include programmable code that is stored in the memory 103 and executed by the processors 102. In one embodiment, the electronic device may include or be electronically coupled to a computer-readable medium that stores computerized codes of the modules 105-108.

The data patch obtaining module 105 is configured to obtain two 3D data patches A and B, from different angles. Obtaining the data patches A, B, as mentioned above, can be via control of an image measuring device, such as a camera. In one example, the data patches A, B can be measurements taken from a side of a human's face that measures various measurement data between facial features of the face. In this embodiment, patch A is set to be a reference data patch, and patch B is set to be a comparative data patch.

The data point selecting module 106 is configured to select the reference data points from the reference 3D data patch, and select the comparative data points from the comparative 3D data patch. The comparative data points are nearest data points to the reference data points in the comparative 3D data patch, or the reference data points are nearest data points to the comparative data points in the reference 3D data patch.

The reference patch combining module 107 is configured to combine the reference data points and the data points in the reference 3D data patch which are adjacent to the pixel coordinates of the reference data points, to form a triangular patch. The side length of the triangular patch is less than a first distance threshold. The first distance threshold is k1 times of the straight-line distance between adjacent planes of pixel in the reference 3D data patch, and the value range for k1 is 2≤k1≤5.

The first determining module 108 is configured to determine whether the distance between the reference data point and the comparative data point in a pair of nearest points is greater than a second distance threshold. If it is greater than the second distance threshold, the comparative data points are determined as non-redundant data. The second distance threshold is k2 times of the side length of the triangular patch, and the value range for k2 is 1≤k2≤3.

With the embodiment of the present disclosure, when identifying the redundant data in two 3D data patches, the comparative data points being nearest to the reference data points in the reference data patches are selected, the distance between the comparative data points and the reference data points is calculated and further determined to be greater than the second distance threshold or not. If the distance is greater than the second distance threshold, the comparative data points are determined as non-redundant data. It is understood that the second distance threshold is not regarded as a specific value but related to the distance between the data points in the data patches. As such, a method to simply and quickly determining redundant data is performed, and the accuracy for identifying redundant data is ensured.

Figure 2:
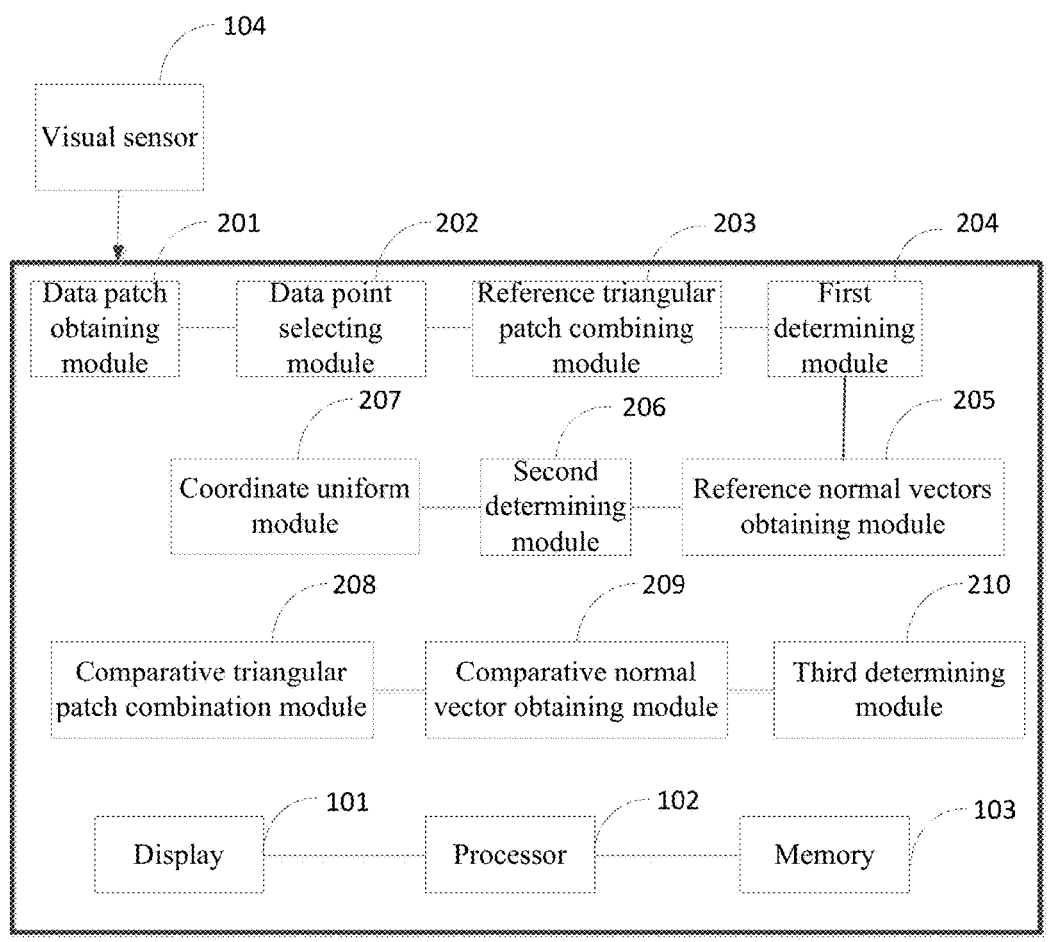
FIG. 2 is a block diagram of the electronic device according to another embodiment of the disclosure.

FIG. 2 is a block diagram of the electronic device 100*a* according to another embodiment of the disclosure. In this embodiment, the electronic device 100*a* includes a data patch obtaining module 201, a data point selecting module 202, a reference triangular patch combining module 203, a first determining module 204, a reference normal vectors obtaining module 205, and a second determining module 206. The modules 201-206, in one embodiment, may include programmable code that is stored in the memory 103 and executed by the processors 102.

The data patch obtaining module 201 is configured to obtain two 3D data patches A and B of an object according to measurements of different visual angles of the object. In this embodiment, patch A is set to be a reference data patch, and patch B is set to be a comparative data patch.

The data point selecting module 202 is configured to select the reference data points from the reference 3D data patch, and the comparative data points are selected from the comparative 3D data patch. The comparative data points are the nearest data points to the reference data points in the comparative 3D data patch, or the reference data points are the nearest data points to the comparative data points in the reference 3D data patch.

The reference triangular patch combining module 203 is configured to combine the reference data points and the data points in the reference 3D data patch which are adjacent to the pixel coordinates of the reference data points, to form a triangular patch. The side length of the triangular patch is less than a first distance threshold. The first distance threshold is k1 times of the straight-line distance between adjacent planes of pixel in the reference 3D data patch, and the value range for k1 is 2≤k1≤5.

The first determining module 204 is configured to determine that whether the distance between the reference data point and the comparative data point is greater than a second distance threshold. If it is greater than the second distance threshold, the comparative data points are determined as non-redundant data. The second distance threshold is k2 times of the side length of the triangular patch, and the value range for k2 is 1≤k2≤3.

The reference normal vectors obtaining module 205 is configured to name the set of all triangular patches consisting of the reference data points as the first ring of adjacent surfaces of the reference data points, while the first determining module 204 determines the distance between the reference data point and the comparative data point is less than or equal to the second distance threshold, and further configured to determine the normal vector corresponding to the first ring of adjacent surfaces of the reference data points. The normal vector is obtained by weighting of respective normal vectors corresponding to the triangular patches comprised in the first ring of adjacent surfaces.

The second determining module 206 is configured to determine whether the comparative projection points of the comparative data points which project on the first ring of adjacent surfaces along the normal vector are located on any one of the triangular patches in the first ring of adjacent surfaces. If the comparative projection points are located on any one of the triangular patches in the first ring of adjacent surfaces, the comparative data points are determined as redundant data, otherwise the comparative data points are determined as non-redundant data.

Furthermore, the apparatus further includes a coordinate uniform module 207. The coordinate uniform module 207 is configured for determining whether the coordinate system of the reference 3D data patch and that of the comparative 3D data patch are same or not, before the data point selecting module selects the reference data points and comparative data points. If not, the coordinates of the reference 3D data patch and that of the comparative 3D data patch are unified/converted/transformed/uniformed into the same coordinate system by the coordinate uniform module 207.

In addition, the apparatus further comprises a comparative triangular patch combination module 208, a comparative normal vector obtaining module 209 and a third determining module 210.

The comparative triangular patch combination module 208 is configured for combining the comparative data points with the data points in the comparative 3D data patch which being adjacent to the pixel coordinates of the comparative data points to form a triangular patch before the determination performed by the second determining module. The side length of the triangular patch is less than the first distance threshold, where the first distance threshold is k3 times of the mean straight-line distance between adjacent planes of pixel in the comparative 3D data patch, and the value range for k3 is 2≤k3≤5.

The comparative normal vector obtaining module 209 is configured for forming the set of all triangular patches which consist of the comparative data points and are called as first ring of adjacent surfaces of the comparative data points; and determining the normal vector corresponding to the first ring of adjacent surfaces of the comparative data points, wherein the normal vector is obtained by weighting of respective normal vectors corresponding to the triangular patches comprised in the first ring of adjacent surfaces.

The third determining module 210 is configured for determining whether an angle between the normal vector corresponding to the first ring of adjacent surfaces of the comparative data points and the normal vector corresponding to the first ring of adjacent surfaces of the reference data points is greater than 90°. If it is greater than 90°, the comparative data points are determined as non-redundant data; if it is less than or equal to 90°, the second determining module 206 would determine whether the comparative projection points of the comparative data points which project on the first ring of adjacent surfaces along the normal vector are located on any one of the triangular patches in the first ring of adjacent surfaces.

Figure 3:
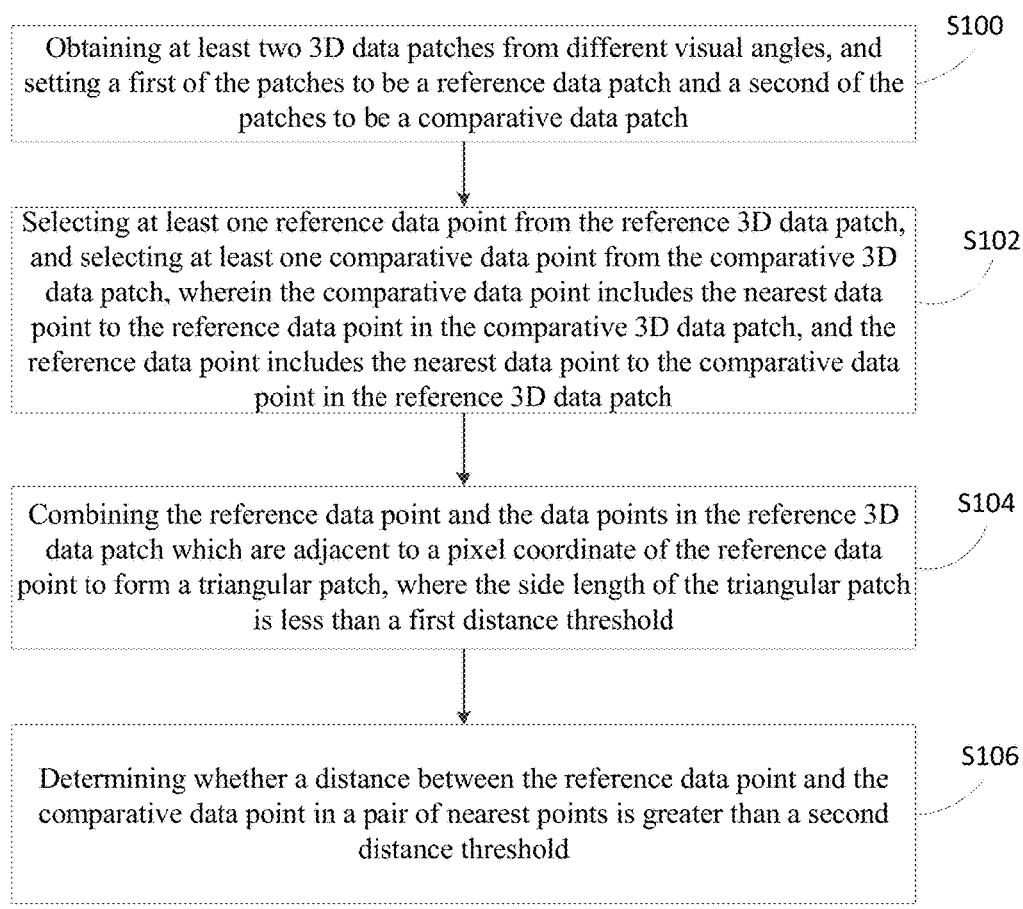
FIG. 3 is a flowchart of a method of identifying redundant data, according to an embodiment of the disclosure.

FIG. 3 is a flowchart of a method of identifying redundant data, according to an embodiment of the invention. The method may include the following steps S100-S106.

In step S100, two 3D data patches A and B (first 3D data patch and second 3D data patch) are obtained from different visual angles. In this embodiment, patch A is set to be a reference data patch, and patch B is set to be a comparative data patch.

It is known that the data redundancy is resulted from duplicate data existed in two different 3D data patches, therefore, identification of redundant data needs to be performed based on the comparison of two different 3D data patches A and B. The two 3D data patches A and B are shown as FIG. 2a and FIG. 2b. For the convenience of description, the two 3D data patches to be compared are respectively referred to a reference 3D data patch and a comparative 3D data patch. Take the reference 3D data patch as the reference object, the duplicate data existed in the comparative 3D data patch and the reference 3D data patch could be identified as the redundant data.

In fact, when duplicate data is existed in the two different 3D data patches A and B, the duplicate data point in patch A can be taken as the redundant data, and the duplicate data point in patch B may also be the redundant data. That is to say, the reference 3D data patch is unspecified, and the two 3D data patches can be randomly chosen as the reference data patch or the comparative data patch. In the present embodiment, taken as an example, the duplicate data point in patch A may be taken as the reference data for identifying the corresponding redundant data in patch B, as to introduce the identification method of redundant data of the present disclosure.

Additionally, to balance the data quantity in two of the data patches during identifying the redundant data, it is needed to avoid both of the redundant data to be defined in the same data patch, and to be deleted or processed later in the same data patch (e.g. for identifying all of the duplicate data in data patch A and B, if data patch A is always realized as the reference data, all of the redundant data in the data patches A and B will be existed in data patch B). In this disclosure, the data point in the data patch A is defined as the reference data at first, and the data point in the data patch B is realized as the reference data in turn after completing a first identification, to perform a second identification. That is, the two 3D data patches to be compared are defined as the reference data or the comparative data by turns, and finally complete all of the identification of redundant data.

In step S102, the reference data points are selected from the reference 3D data patch, and the comparative data points are selected from the comparative 3D data patch. The comparative data points are the nearest data points to the reference data points in the comparative 3D data patch, and the reference data points are the nearest data points to the comparative data points in the reference 3D data patch.

Specifically, in one embodiment, a data point is randomly selected from the comparative data patch as the comparative data point at first. And then, according to the 3D coordinate of each data point, the distance between each data point in the reference 3D data patch and the selected comparative data point is calculated. After that, the nearest data points compared to the comparative data point are defined as the reference data points.

Optionally, in another embodiment, a data point is randomly selected from the reference data patch as the reference data point. Similarly, the distance between each data point in the comparative 3D data patch and the selected reference data point is calculated according to the 3D coordinate of each data point. And the nearest data points compared to the reference data point are defined as the comparative data points.

Furthermore, for the convenience of determining whether all of the data points in the 3D data patches are the traversal for redundant data, it is preferably to select the comparative data points along a boundary line of the comparative 3D data patch for the second 3D data patch B. After finishing the traversal along the boundary line in the second 3D data patch, the traversal is approaching to the internal portion from the boundary line, since the points on the boundary line have a higher possibility of being the redundant data.

It is needed to be specified that an order of selection of the comparative data point and the reference data point is not restricted, as long as one kind of the data point is selected, the other kind of data point would be the nearest data point to the selected data point in the other data patch.

In step S104, the reference data points and the data points in the reference 3D data patch which are adjacent to the pixel coordinates of the reference data points are combined to form a triangular patch. The side length of the triangular patch is less than a first distance threshold. Wherein the first distance threshold is k1 times of the straight-line distance between adjacent planes of pixel in the reference 3D data patch, and the value range for k1 is 2≤k1≤5.

In particular, the straight-line distance between adjacent planes of pixel refers to a pixel size of a sensor sensitive material (e.g. CCD). Wherein, k1 values in the range of 2-5, e.g. 2, 3, 4, to limit the side length of the triangular patch formed with data points, ensure the quality of connection of the triangular patches, and eliminate suspension of bevel and discrete noise points to the 3D data patch. The side length of the triangular patch refers to a space distance between the reference data and adjacent data points thereof. It is understood that the greater the value of K1 is, the greater the first distance threshold will be. As such, more triangular patches can be formed. Similarly, the smaller the value of K2 is, the smaller the first distance threshold will be. As such, less triangular patches would be formed. The value of k1 can be set according to specific implementation.

Specifically, since forming a triangular patch needs three data points, the data points in adjacent pixel coordinates can be accessed in horizontal or vertical direction, and, of course, can also be in the hypotenuse or other directions, it is not limited in the present disclosure. In order to be understood conveniently, it is not limited but only illustrated with a specific example. Assuming an image size of the 3D data patch is 5*5, the pixel coordinates of the 3D data patch can be shown as FIG. 5. Take data point D33 to be the reference data points as an example, the pixel coordinates adjacent to the data points D33 can be the following combination: {D32, D23, D33}, {D23, D33, D34}, {D32, D33, D43}, {D34, D33, D43} in vertical and horizontal direction, and {D24, D33, D34}, {D22, D33, D32}, {D42, D33, D43}, {D44, D33, D34} in the direction shown by the hypotenuse. Regarding to the combination of {D32, D23, D33}, distance between two data points can be calculated according to the world coordinate of the data points D32, D23, D33. If the distance is less than a preset value, the three points D32, D23, D33 can constitute to a triangular patch, otherwise, the three points D32, D23, D33 cannot be combined into a triangular patch. So are the other combinations of data points.

It is worth to specify that if there is a situation that some reference data points in the reference data patch do not form a triangular patch, these isolated data points should be recognized as noise points and have to be removed. After that, new 3D data patches A and B are formed as a new basis data for determining redundant data. And, the above method is performed again, to increase the quality of the 3D data patches in the following processing.

In step S106, it is determined that whether the distance between the reference data point and the comparative data point in a pair of nearest points is greater than a second distance threshold. If it is greater than the second distance threshold, the comparative data points are determined as non-redundant data. The second distance threshold is k2 times of the side length of the triangular patch, and the value range for k2 is $1 \leq k2 \leq 3$.

In this step, the relationship of the distance between the reference data point and the comparative data point with the second distance threshold is determined. If the distance between the reference data point and the comparative data point is greater than the second distance threshold, the second data point and first data point are obviously different imaging data of two locations and are not regarded as duplicate data. As such, the second data point is not determined as redundant data.

In the embodiment of the present disclosure, the second distance threshold is k2 times of an average side length L of the triangular patch combined in the step S104, and the value range for k2 is $1 \leq k2 \leq 3$, to exclude a situation of being non-redundant data. The side length is a spatial straight-line distance between two vertexes of the triangular patch. It is known that a greater K2 leads to a greater second distance threshold, and consequently, more data points would be determined as redundant data while the distance of more comparative data points are smaller than the second distance threshold. In contrast, a smaller K2 leads to a smaller second distance threshold. Therefore, less data points would be determined as redundant data while the distance of less comparative data are smaller than the second distance threshold. It is understood that the value of k2 can be set according to specific implementation.

With the embodiment of the present disclosure, when identifying the redundant data in two 3D data patches, the comparative data points being nearest to the reference data points in the reference data patches are selected, the distance between the comparative data points and the reference data points is calculated and further determined to be greater than the second distance threshold or not. If the distance is greater than the second distance threshold, the comparative data points are determined as non-redundant data. It is understood that the second distance threshold is not regarded as a specific value but related to the distance between the data points in the data patches. As such, a method to simply and quickly determining redundant data is performed, and the accuracy for identifying redundant data is ensured.

Figure 4A:
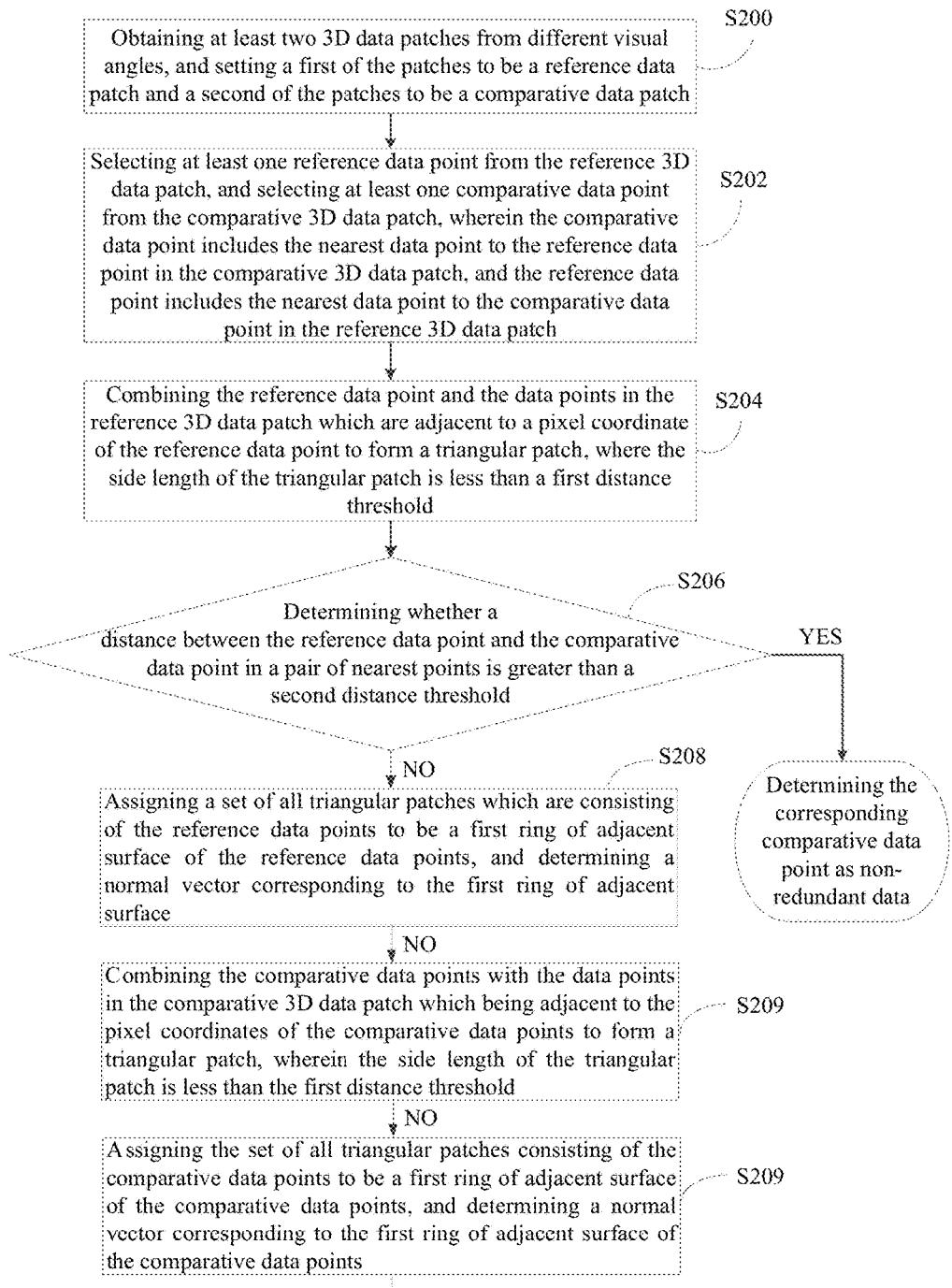
FIG. 4A is a flowchart of another method of identifying redundant data, according to an embodiment of the invention.
Figure 4B:
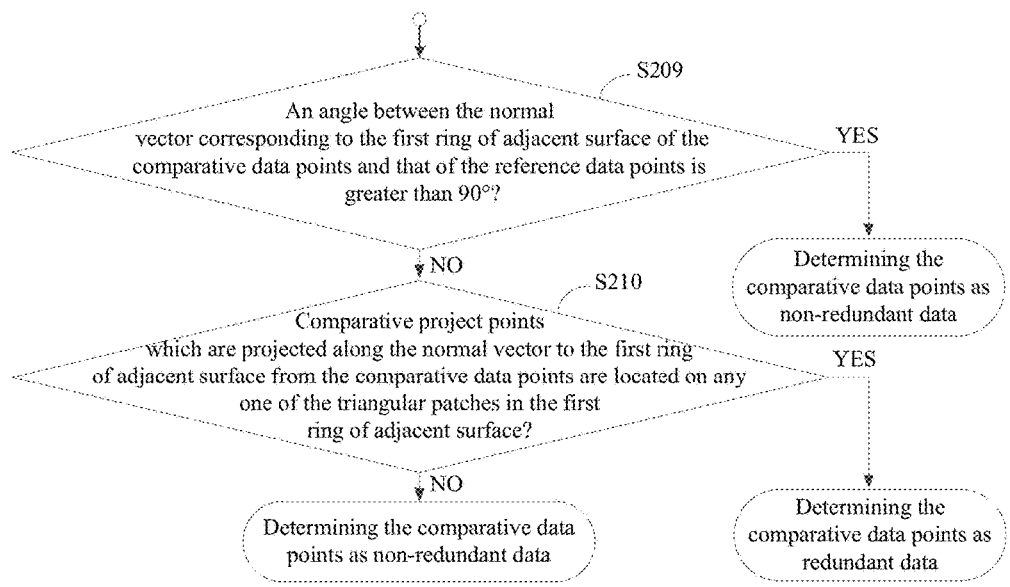
FIG. 4B is a continuation of the flowchart of FIG. 4A.

FIGS. 4A and 4B are flowcharts of another method of identifying redundant data, according to an embodiment of the invention, the method may include the following steps S200-S210.

In step S200, two 3D data patches A and B are obtained, from different visual angles. Patch A is set to be a reference data patch, and patch B is set to be a comparative data patch.

In step S202, the reference data points are selected from the reference 3D data patch, and the comparative data points are selected from the comparative 3D data patch. In this embodiment, the comparative data points are the nearest data points to the reference data points in the comparative 3D data patch, and the reference data points are the nearest data points to the comparative data points in the reference 3D data patch.

Furthermore, as the 3D data patches obtained from different visual angles are respectively independent, different coordinate systems may be configured for theses data patches. Therefore, for convenient calculation for the distance between a first and a second data point, before performing step S202, the following step should be further performed: determining whether the coordinate system of the reference 3D data patch and that of the comparative 3D data patch are same or not. If not, then converting the coordinate of the reference 3D data patch and that of the comparative 3D data patch into the same coordinate system.

As data are obtained from various angles, the coordinate system of the reference 3D data patch may be different from that of the comparative 3D data patch. In case of two different coordinate systems, the coordinate of the reference 3D data patch and that of the comparative 3D data patch should be converted into the same coordinate system at first, for convenient computations in the following steps.

In step S204, the reference data points and the data points in the reference 3D data patch which are adjacent to the pixel coordinates of the reference data points are combined to form a triangular patch. The side length of the triangular patch is less than a first distance threshold. The first distance threshold is k1 times of the straight-line distance between adjacent planes of pixel in the reference 3D data patch, and the value range for k1 is $2 \leq k1 \leq 5$.

In step S206, it is determined that whether the distance between the reference data point and the comparative data point in a pair of nearest points is greater than a second distance threshold. If it is less than or equal to the second distance threshold, steps S208 to S210 would be performed. If it is greater than the second distance threshold, the comparative data points are determined as non-redundant data. The second distance threshold is k2 times of the side length of the triangular patch, and the value range for k2 is $1 \leq k2 \leq 3$.

In this step, the relationship of the distance between the reference data point and the comparative data point to the second distance threshold is determined. If the distance between the reference data point and the comparative data point is greater than the second distance threshold, the second data point and first data point are obviously different imaging data of two locations and are not regarded as duplicate data. As such, the second data point is not determined as redundant data. If the distance between the reference data point and the comparative data point is less than or equal to the second distance threshold, the second data point and the first data point may be regarded as duplicate data, and at this time, it will go on to the following steps to further determine whether the data points are redundant data.

Taking this step, the data points which are obviously not belonged to the duplicate data can be excluded, thereby the following determination is conducted only on these data which may be regarded as duplicate data, reducing the calculation amount for subsequent determination on the data which are obviously not belonged to the duplicate data. This step is equivalent to a preliminary determination for redundant data.

In step S208, the set of all triangular patches consisting of the reference data points is assigned as a first ring of adjacent surfaces of the reference data points. And, a normal vector corresponding to the first ring of adjacent surfaces of the reference data points is determined, wherein the normal vector is obtained by weighting of respective normal vectors corresponding to the triangular patches comprised in the first ring of adjacent surfaces.

Figures 6, 7:
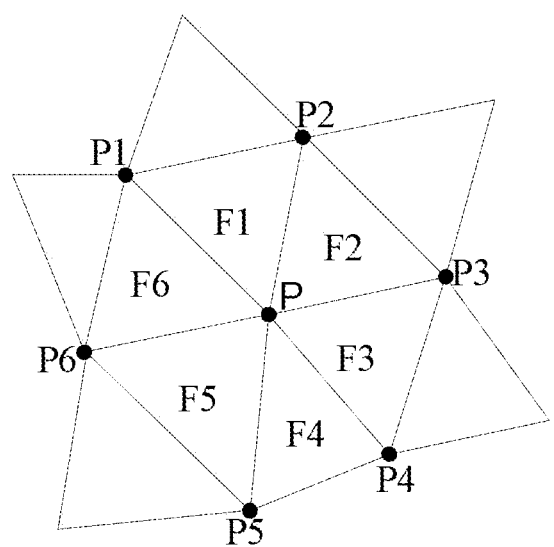
FIG. 6 is a schematic diagram of one kind of pixel coordinates.
FIG. 7 is a schematic diagram of a ring of adjacent surfaces.

As shown in FIG. 7, assuming that the reference data point P is combined with the data points P2, P3, P4, P5, P6, which being adjacent to the coordinate of P, to form triangular patches F1, F2, F3, F4, F5, F6, the first ring of adjacent surfaces of the first data point P is the set of F1, F2, F3, F4, F5 and F6.

Once the first ring of adjacent surfaces of the reference data point is determined, the normal vector of the first ring of adjacent surfaces for the data point is calculated on the basis of respective normal vectors corresponding to the triangular patches in the first ring of adjacent surfaces. As an example, the corresponding normal vector Normal$^P$ to the first ring of adjacent surfaces of the first data point is determined according to the formula below:

$$\mathrm{Normal}_p = \sum_{i=1}^{n} \frac{S_{\Delta i}}{S_{\Delta total}} \mathrm{Normal}_{\Delta i} \tag{1}$$

n represents the number of the triangular patches whereto the first data point belongs; $S_{\Delta i}$ represents the area of the i th triangular patch; $S_{\Delta total}$ represents the sum of area for each triangular patch; $\mathrm{Normal}_{\Delta i}$ represents the normal vector for the i th triangular patch.

Figure 5A:
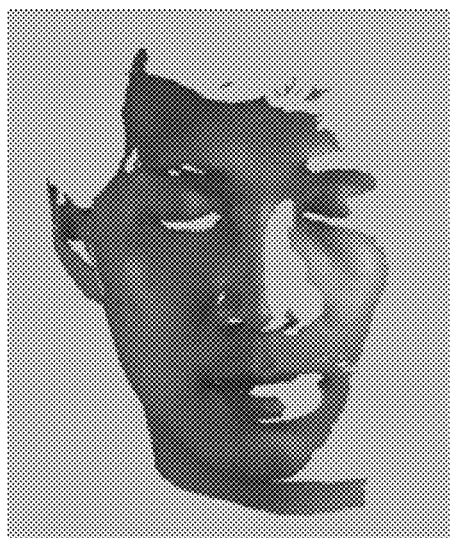
FIG. 5A is a schematic diagram of one 3D data patch and FIG. 5B is a schematic diagram of another 3D data patch.
Figure 5B:
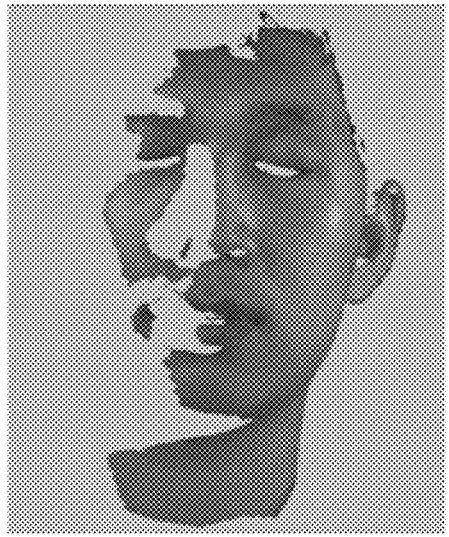

For ease of understanding, herein FIG. 5 is still used as an example. The normal vector $\mathrm{Normal}_{\Delta 1}$, $\mathrm{Normal}_{\Delta 2}$, $\mathrm{Normal}_{\Delta 3}$, $\mathrm{Normal}_{\Delta 4}$, $\mathrm{Normal}_{\Delta 5}$, $\mathrm{Normal}_{\Delta 6}$ and area $S_{\Delta 1}$, $S_{\Delta 2}$, $S_{\Delta 3}$, $S_{\Delta 4}$, $S_{\Delta 5}$, $S_{\Delta 6}$ of each triangular patch are determined according to the world coordinate of each vertex of triangular patch F1, F2, F3, F4, F5 and F6. For example: for triangular patch F1, the normal vector $\mathrm{Normal}_{\Delta 1}$ and area $S_{\Delta 1}$ of triangular patch F1 can be calculated according to the world coordinates of the vertexes (data points P1, P2 and P) of triangular patch F1. By that analogy, the normal vectors and areas of other triangular patches can be determined. The area $S_{\Delta total}$ of the first ring of adjacent surfaces is determined on the basis of the area of each triangular patch, that is, the total area $S_{\Delta total1}$ of the triangular patches within the first ring of adjacent surfaces is $$S_{\Delta total} = \sum_{i=1}^{n} S_{\Delta i} \tag{2}$$

Therefore, the normal vector $$\mathrm{Normal}_p = \sum_{i=1}^{n} \frac{S_{\Delta i}}{S_{\Delta total}} \mathrm{Normal}_{\Delta i}$$

of the first ring of adjacent surfaces is determined. And the normal vector is related to each triangular patch within the first ring of adjacent surfaces with areas using as the weight than determined by any of the triangular patches solely. Hence, it can improve the accuracy for identifying redundant data.

In step S210, whether comparative projection points which are projected along the normal vector to the first ring of adjacent surfaces from the comparative data points are located on any one of the triangular patches in the first ring of adjacent surfaces is determined. If the comparative projection points are located on any one of the triangular patches in the first ring of adjacent surfaces, the corresponding comparative data points are determined as redundant data, otherwise the comparative data points are determined as non-redundant data.

In concrete implementations, the comparative data points are respectively projected to every triangular patch in the first ring of adjacent surfaces along the normal vector of the first ring of adjacent surfaces, and each projection location is identified as a first projection point. If the first projection point is on any of the triangular patches, it means the first projection point is in the first ring of adjacent surfaces. For ease of understanding, herein FIG. 7 is still configured for description. For example, comparative data point $P_{nA2}$ projects to triangular patch F1 along the direction of normal vector $\mathrm{Normal}_p$. Assuming that the second data point $P_{nA2}$ projects to triangular patch F1 along the direction of normal vector $\mathrm{Normal}_p$, forming the first projection point $P_{nA1}'$. The vertex P of triangular patch F1 is represented by $P_{nA1}$, vertex P1 is represented by $P_{mA1}$ and vertex P2 is represented by $P_{lA1}$, therefore, the first projection point $P_{nA1}'$ can be represented with the linear relation of data points (P, P1, P2), specifically, as shown in formula (3):

$$P_{nA1}' = aP_{nA1} + bP_{mA1} + cP_{lA1} \tag{3}$$

Coefficient a, b and c are normalizing parameters, and a+b+c=1.

If a≥0, b≥0, c≥0, it means that first projection point $P_{nA1}'$ lies in the triangular patch F1, and this information will be recorded. Thereby, the first projection point formed through the projection to the first ring of adjacent surfaces by comparative data point along the direction for normal vector of the first ring of adjacent surfaces is in the first ring of adjacent surfaces.

For improving the accuracy for identifying redundant data, if all projection points of the comparative data points are not in the first ring of adjacent surfaces, the following steps can also be performed: finding out the second-nearest data point P to the comparative data point in the first ring neighborhood and using it as the reference data point (the second-nearest point in comparison with point P) to replace the original reference data point P, and performing steps S204, S206, S208 and S210 again. That is, obtaining the weighted normal vector $\mathrm{Normal}_p$ and first ring of adjacent surfaces again. And, the comparative data points are determined again with projection along $\mathrm{Normal}_p$.

If the projection points of the comparative data points are still not in the first ring of adjacent surfaces, find out the third-nearest data point to the comparative data point in the first ring neighborhood and use it as the reference data point, then perform steps S204, S206, S208 and S210 again. By that analogy, it is also possible to find out the fourth-nearest, fifth-nearest . . . data point to the comparative data point, that is, this step can be performed for n times, wherein a greater n brings a higher accuracy for the identification result, meanwhile brings a greater calculation amount. In the embodiment of the present disclosure, the preferred n is 2, which ensures an accurate identification result without bringing an overlarge calculation amount.

Steps S208, 210 are equivalent to a precise determination for redundant data.

Furthermore, after step S208 and before step S210, step S209 can also be included. In step S209, the comparative data points with the data points in the comparative 3D data patch which being adjacent to the pixel coordinates of the comparative data points are combined to form a triangular patch. The side length of the triangular patch is less than the first distance threshold. The first distance threshold is k3 times of the straight-line distance between adjacent planes of pixel in the comparative 3D data patch, and the value range for k3 is 2≤k3≤5. The set of all triangular patches consisting of the comparative data points is called/assigned a first ring of adjacent surfaces of the comparative data points. In this step, the normal vector corresponding to the first ring of adjacent surfaces of the comparative data points is determined, and whether an angle between the normal vector corresponding to the first ring of adjacent surfaces of the comparative data points and that of the reference data points is greater than 90° is also determined. If the angle is greater than 90°, the comparative data points are determined as non-redundant data and the process is finished; if it is less than or equal to 90°, step S210 would be performed.

At first, the situation where a thin-wall structure is in the reference 3D data patch and comparative 3D data patch should be excluded. In a real situation, in case the reference 3D data patch and comparative 3D data patch respectively making up the inner and outer geometry of the digitized object, and collectively completing the presentation for its 3D geometric shape (i.e. the thin-wall structure), for example, although the inner and outer wall of a cup are close in distance, it doesn't turn out to be a redundant situation. Therefore, it is required to determine whether the angle between the normal vector corresponding to the first ring of adjacent surfaces of the comparative data points and that of the reference data points is greater than 90°. If it is greater than 90°, it means the existence of a thin-wall structure. The comparative 3D data points are determined as non-redundant data and will not be processed as redundant data.

Specifically, method of calculating a dot product for two normal vectors can be used to determine whether the angle between the normal vector corresponding to the first ring of adjacent surfaces of the comparative data points and that of the reference data points is greater than 90°.

With the embodiment of the present disclosure, when identifying the redundant data, a preliminary determination with the second distance threshold is performed at first, to exclude the data points which are obviously not belonged to the redundant data. Then, a precise determination is introduced, for determining if the data points which are less than or equal to the second distance threshold are redundant data based on the locations of the projection points. With the double determination method of threshold comparison and the locations of projection points along the normal vectors, the accuracy for identifying redundant data is improved without bringing an overlarge calculation amount, in comparison to the method simply using the threshold comparison. Furthermore, before the precise determination, the determination for thin-wall structure can also be conducted to exclude the situation wherein the thin-wall data is mis-determined as redundant data, thereby reducing the occurrence for mis-determining non-redundant data and further improving the accuracy for identifying redundant data.

With the embodiment of the present disclosure, when identifying the redundant data, a preliminary determination with the distance threshold is performed at first, to exclude the data points which are obviously not belonged to the redundant data. Then a precise determination is introduced, for determining if the data points which are less than or equal to the distance threshold are redundant data based on the locations of the projection points. With the double determination method based on threshold comparison and the locations of projection points along the normal vectors, the accuracy for identifying redundant data is improved without bringing an overlarge calculation amount, in comparison to the method simply using the threshold comparison.

Note that by describing the above embodiments, those skilled in the art can clearly understand that the present disclosure may be implemented by software plus a necessary hardware platform, and definitely may also be implemented by all the hardware. Based on this understanding, technical solutions of the present disclosure is to contribute to the background art, all or part may be embodied in the form of a software product, which computer software product may be stored in a storage medium, such as ROM/RAM, magnetic disk, optical disk, etc., includes several instructions to instruct a computer device (may be a personal computer, a server, or network equipment) to perform the various embodiments of the invention, or certain parts of the method according to the embodiment.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method of identifying redundant data, comprising:
   obtaining at least two 3D data patches from at least one image sensor representative of a tangible object from different visual angles of the tangible object, and setting a first of the data patches to be a reference data patch and a second of the data patches to be a comparative data patch;
   selecting at least one reference data point from the reference 3D data patch, and selecting at least one comparative data point from the comparative 3D data patch;
   measuring a distance between each pair of the reference data point and the adjacent comparative data point, if the measured distance between the reference data point and the comparative data point is greater than a second distance threshold, determining the comparative data point thereof in the comparative 3D data patch as being non-redundant data; and
   combining each reference data point with adjacent data points to form a first triangular patch;
   wherein a side length of the first triangular patch is less than a first distance threshold, and the first distance threshold is k1 times of a straight-line distance between two adjacent planes of pixel in the reference 3D data patch, and a range for k1 is 2≤k1≤5, the second distance threshold is k2 times of the side length of the first triangular patch, and a range for k2 is 1≤k2≤3.

2. The method of identifying redundant data in claim 1, further comprising: before the step of selecting the reference data point, determining whether the coordinate system of the reference 3D data patch and that of the comparative 3D data patch are same or not, if not, converting the coordinates of the reference 3D data patch and the coordinates of the comparative 3D data patch into a same coordinate system.

3. The method of identifying redundant data in claim 1, wherein if the distance between the reference data point and the comparative data point is less than or equal to the second distance threshold, the method further comprises:
   assigning a set of the first triangular patches consisting of the reference data points to be a first ring of an adjacent surfaces of the reference data points, and obtaining a normal vector corresponding to the first ring of adjacent surfaces;

in response to determining a plurality of comparative projection points, which are projected along the normal vector to the first ring of adjacent surfaces from the comparative data points, are located on any one of the first triangular patches in the first ring of adjacent surfaces, determining the comparative data points as being redundant data; and in response to determining a plurality of comparative projection points, which are projected along the normal vector to the first ring of adjacent surfaces from the comparative data points, are not located on any one of the first triangular patches in the first ring of adjacent surfaces, determining the comparative data points as being non-redundant data.

4. The method of identifying redundant data in claim 3, wherein the normal vector is obtained by weighting of respective normal vectors corresponding to the first triangular patches comprised in the first ring of adjacent surfaces.

5. The method of identifying redundant data in claim 3, wherein, the normal vector to the first ring of adjacent surfaces of the data point is determined according to a formula as below:

$$Normal_p = \sum_{i=1}^{n} \frac{S_{\Delta i}}{S_{\Delta total}} Normal_{\Delta i}$$

wherein, $Normal^p$ represents a normal vector, n represents a number of the first triangular patches whereto the data point belongs; $S_{\Delta total}$ represents an area of the i th first triangular patch; $S_{\Delta total}$ represents a sum of area for each first triangular patch; $Normal_{\Delta i}$ represents a normal vector for the i th first triangular patch.

6. The method of identifying redundant data in claim 3, wherein, a projection point $P_{nA1}'$ is represented with a linear relation of corresponding data points as shown in formula:

$$P_{nA1}' = aP_{nA1} + bP_{n/a1} + cP_{lA1}$$

wherein coefficient a, b and c are normalizing parameters, and a+b+c=1, wherein if a≥0, b≥0, c≥0, the projection point $P_{nA1}'$ is located in the first triangular patch.

7. The method of identifying redundant data in claim 3, further comprising:

combining each comparative data points with adjacent data points to form a second triangular patch, wherein a side length of the second triangular patch is less than the first distance threshold;

assigning all of the second triangular patches consisting of the comparative data points to be a first ring of adjacent surfaces of the comparative data points, and determining a normal vector corresponding to the first ring of adjacent surfaces of the comparative data points; and in response to determining an angle between the normal vector corresponding to the first ring of adjacent surfaces of the comparative data points and that of the reference data points is greater than 90°, determining the comparative data points as being non-redundant data; and in response to determining an angle between the normal vector corresponding to the first ring of adjacent surfaces of the comparative data points and that of the reference data points is less than or equal to 90°, returning to the step of determining whether the plurality of comparative projection points which are projected along the normal vector to the first ring of adjacent surfaces from the comparative data points are located on any one of the first triangular patches in the first ring of adjacent surfaces of the comparative data points or not.

8. The method of identifying redundant data in claim 7, wherein the first distance threshold is k3 times of a straight-line distance between two adjacent planes of pixel in the comparative 3D data patch, and the value range for k3 is 2≤k3≤5.

9. The method of identifying redundant data in claim 7, wherein the normal vector is obtained by weighting of respective normal vectors corresponding to the second triangular patches comprised in the first ring of adjacent surfaces of the comparative data points.

10. An electronic device, comprising:

memory, one or more processors, the memory storing modules containing computerized code that when executed by the processor, causes the processor to execute a method comprising:

obtaining at least two 3D data patches from at least one image sensor representative of a tangible object from different visual angles of the tangible object, and setting a first of the data patches to be a reference data patch and a second of the data patches to be a comparative data patch;

selecting at least one reference data point from the reference 3D data patch, and selecting at least one comparative data point from the comparative 3D data patch;

combining each reference data points with adjacent data points to form a triangular patch, wherein a side length of the triangular patch is less than a first distance threshold, and the first distance threshold is k1 times of a straight-line distance between two adjacent planes of pixel in the reference 3D data patch, and a range for k1 is 2≤k1≤5; and measuring a distance between each pair of the reference data point and the adjacent comparative data point; and if the measured distance between the reference data point and the comparative data point is greater than a second distance threshold, determining the comparative data point thereof as being non-redundant data, wherein the second distance threshold is k2 times of the side length of the triangular patch, and a range for k2 is 1≤k2≤3.

11. The electronic device in claim 10, wherein before selecting the at least one reference data point and the comparative data point, the method further comprises:

determining whether the coordinate system of the reference 3D data patch and that of the comparative 3D data patch are same or not, if not, converting the coordinates of the reference 3D data patch and that of the comparative 3D data patch into a same coordinate system.

12. The electronic device in claim 10, wherein the method further comprises:

when the distance between the reference data point and the adjacent comparative data point is less than or equal to the second distance threshold, assigning a set of all triangular patches consisting of the reference data points as a first ring of adjacent surfaces of the reference data points, and obtaining a normal vector corresponding to the first ring of adjacent surfaces of the reference data points by weighting of respective normal vectors corresponding to the triangular patches comprised in the first ring of adjacent surfaces; and in response to determining a plurality of comparative projection points which are projected along the normal vector to the first ring of adjacent surfaces from the comparative data points are not located on any one of the triangular patches in the first ring of adjacent surfaces, determining the comparative data points as being non-redundant data.

13. The electronic device in claim 12, wherein the method further comprises:
combining each comparative data points with adjacent data points to form another triangular patch, wherein the side length of the triangular patch is less than the first distance threshold; and
assigning all of the triangular patches consisting of the comparative data points to be a first ring of adjacent surfaces of the comparative data points; and obtaining the normal vector corresponding to the first ring of adjacent surfaces of the comparative data points by weighting of respective normal vectors corresponding to the triangular patches comprised in the first ring of adjacent surfaces.

14. The electronic device in claim 13, wherein the first distance threshold is k3 times of an averaged straight-line distance between two adjacent planes of pixel in the comparative 3D data patch, and a range for k3 is $2 \le k3 \le 5$.

15. The electronic device in claim 13, wherein the method further comprises:
determining whether an angle between the normal vector corresponding to the first ring of adjacent surfaces of the comparative data points and that of the reference data points is greater than 90° or not; and
if the angle is less than or equal to 90°, returning to the step of determining whether the plurality of comparative projection points which are projected along the normal vector to the first ring of adjacent surfaces from the comparative data points are located on any one of the triangular patches in the first ring of adjacent surfaces or not.

16. The electronic device in claim 15, wherein if the angle is greater than 90°, determining the comparative data point as being non-redundant data.

17. A non-transitory computer-readable medium storing computerized code that when executed by an electronic device comprising memory and one or more processors, causes the processor to execute a method comprising:
obtaining at least two 3D data patches from at least one image sensor representative of a tangible object from different visual angles of the tangible object, and setting a first of the data patches to be a reference data patch and a second of the data patches to be a comparative data patch;
selecting at least one reference data point from the reference 3D data patch, and selecting at least one comparative data point from the comparative 3D data patch;
combining each reference data points with adjacent data points to form a triangular patch, wherein a side length of the triangular patch is less than a first distance threshold, and the first distance threshold is k1 times of a straight-line distance between two adjacent planes of pixel in the reference 3D data patch, and a range for k1 is $2 \le k1 \le 5$; and
measuring a distance between each pair of the reference data point and the adjacent comparative data point; and
if the measured distance between the reference data point and the comparative data point is greater than a second distance threshold, determining the comparative data point thereof as being non-redundant data, wherein the second distance threshold is k2 times of the side length of the triangular patch, and a range for k2 is $1 \le k2 \le 3$.

\* \* \* \* \*